(12) United States Patent
Martello et al.

(10) Patent No.: US 9,014,828 B2
(45) Date of Patent: Apr. 21, 2015

(54) LIGHTING CONTROLLER

(71) Applicant: ABL IP Holding LLC, Conyers, GA (US)

(72) Inventors: Alan Martello, Pittsburgh, PA (US); Robert Bell, Erin (CA); Garrett Douglas, Atlanta, GA (US); Philip Nye, Bournemouth (GB); Eric S. Cornwell, Belleville, NJ (US)

(73) Assignee: ABL IP Holding LLC, Conyers, GA (US)

( * ) Notice: Subject to any disclaimer, the term of this patent is extended or adjusted under 35 U.S.C. 154(b) by 147 days.

(21) Appl. No.: 13/837,533

(22) Filed: Mar. 15, 2013

(65) Prior Publication Data

US 2013/0249433 A1    Sep. 26, 2013

Related U.S. Application Data

(60) Provisional application No. 61/614,318, filed on Mar. 22, 2012.

(51) Int. Cl.
| | |
|---|---|
| *G05B 15/00* | (2006.01) |
| *H05B 37/02* | (2006.01) |
| *G06F 3/048* | (2013.01) |

(52) U.S. Cl.
CPC ............... *H05B 37/02* (2013.01); *G06F 3/048* (2013.01); *H05B 37/0245* (2013.01); *H05B 37/029* (2013.01)

(58) Field of Classification Search
USPC .............................. 700/83; 345/173; 315/292
See application file for complete search history.

(56) References Cited

U.S. PATENT DOCUMENTS

| 7,514,884 | B2* | 4/2009 | Potucek et al. ............... 315/322 |
|---|---|---|---|
| 8,344,665 | B2* | 1/2013 | Verfuerth et al. ............. 315/315 |
| 2011/0187290 | A1* | 8/2011 | Krause ........................... 315/312 |
| 2012/0112662 | A1* | 5/2012 | Hatley et al. .................. 315/294 |
| 2012/0176063 | A1* | 7/2012 | Hatley et al. .................. 315/297 |
| 2013/0221872 | A1* | 8/2013 | Gan et al. ....................... 315/292 |

OTHER PUBLICATIONS

"The Abstract Control Model," White Paper, Horizon, horizoncontrol.com, 2005 (31 pages).

* cited by examiner

*Primary Examiner* — Thuy Vinh Tran
(74) *Attorney, Agent, or Firm* — Kilpatrick Townsend & Stockton, LLP

(57) ABSTRACT

A lighting controller provides a user interface module and a lighting controller engine. The user interface module allows a user to specify settings for one or more lighting fixtures using descriptive, absolute or relative values, which the lighting controller engine translates into fixture-dependent values before sending them to the lighting fixtures. The user interface module also provides context-based displays and context-based controls.

28 Claims, 16 Drawing Sheets

LIGHTING CONTROLLER

RELATED APPLICATION

This application claims priority to U.S. Application No. 61/614,318, Lighting Controller, filed Mar. 22, 2012, which is incorporated herein by reference.

FIELD OF THE INVENTION

The present invention relates to various aspects of a lighting controller, including a user interface for controlling one or more attributes of one or more lighting fixtures, the physical layout of the lighting controller, and the integration of the lighting controller with a handheld computing device.

BACKGROUND

Lighting controllers are used to control lighting fixtures in a theater or other setting. A conventional controller includes input devices, such as sliders, rotatable knobs, and touchscreens to control the settings for the lighting fixtures. Many current controllers place the knobs along the right-hand side of the touchscreen. Such placement is biased towards right-hand dominant users. Since not all users are right-handed and since users frequently move between input controls, there is a need for a more ergonomic layout for a lighting controller.

In addition, many current lighting controllers require lighting operators to specify colors or other attributes using absolute or fixture-dependent values which make controlling the lighting fixtures relatively complicated. For example, some controllers require that a particular color be specified as a certain percentage of each of the color components, such as 75% red, 50% green and 25% blue. Since different types of lighting fixtures may require different inputs, an operator must also know the type of lighting fixture being controlled. In order to make lighting control more intuitive, there is a need for a lighting controller that allows a user to input a descriptive value or a relative value instead of an absolute value.

SUMMARY

One aspect of the present invention provides an ergonomically designed lighting console. The console includes a touchscreen, as well as a number of other tactile input controls, such as sliders, knobs, and buttons.

Another aspect of the invention provides a user interface module and lighting controller engine that allow a user to specify settings for a lighting fixture using descriptive, absolute or relative values. The user interface module provides context-based displays and defines functions associated with various input controls based on the selected context. The lighting controller engine translates the descriptive, absolute or relative values specified by the user using the input controls into the absolute or fixture-dependent values required by the lighting fixtures.

Additional aspects of the invention relate to the content of the displays, the arrangement and sequence of information presented by the displays, and the extension of the user interface to a handheld computing device.

Other features, advantages, and objects of the present invention will be apparent to those skilled in the art with reference to the remaining text and drawings of this application.

DETAILED DESCRIPTION

The present invention provides a lighting controller with an ergonomically designed lighting console that includes a touchscreen as well as a number of tactile input controls. The lighting controller also provides a user interface module and a lighting controller engine. The user interface module allows a user to specify settings for a lighting fixture using descriptive, absolute or relative values, which the lighting controller engine translates into absolute or fixture-dependent values before sending them to the lighting fixtures. The user interface module provides context-based displays and context-based controls.

Lighting Controller

Figure 1:
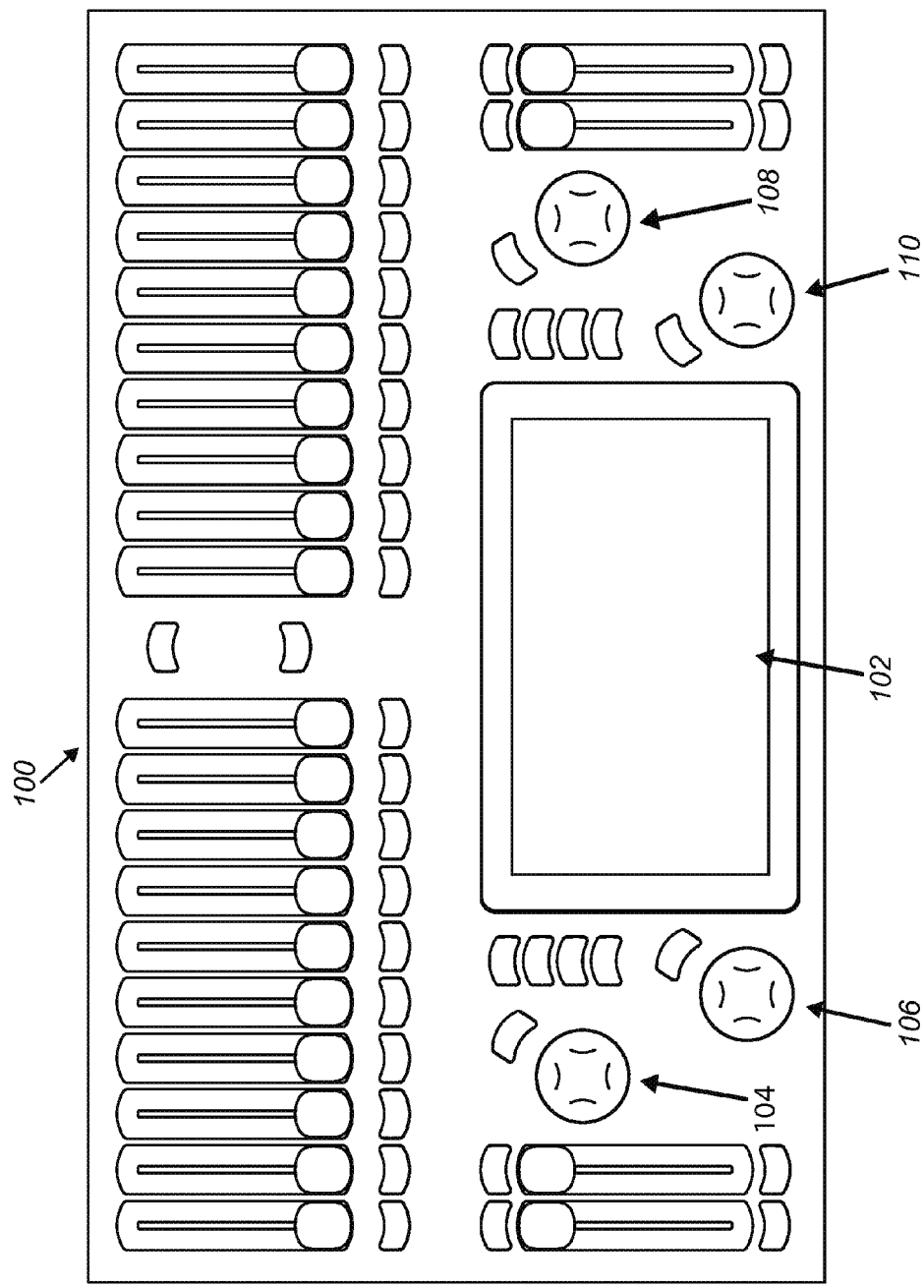
FIG. 1 illustrates an exemplary lighting controller with a touchscreen

Aspects of the present invention may be used with a lighting controller that has a touchscreen approximately centered between the right and left hand edges of the console, as shown in FIG. 1. The controller 100 of FIG. 1 includes a touchscreen 102 and four encoders attached to rotatable knobs 104, 106, 108, and 110. Two of the encoders 108, 110 are located to the right of the touchscreen and two of the encoders 104, 106 are located to the left of the touchscreen.

The placement of the encoders on either side of the touchscreen affords a number of advantages. For example, the placement supports switching operation from one encoder to another with minimal hand and arm motion. The placement also minimizes user motion when a user moves between the touchscreen and the encoders. The placement of the encoders is not biased for left or right-hand dominant users and also keeps a user from visually blocking the touchscreen while operating one of the encoders.

In some implementations the encoders are arranged in a staggered orientation that encourages ergonomic movement and natural operation between the touchscreen and the encoders. One example of a staggered orientation is shown in FIG. 1 where the encoder located closest to the top of the touchscreen is located further from the side edge of the touchscreen than the encoder located closest to the bottom of the touchscreen. The staggered placement allows a comfortable reach to all five devices independently without the need to reach over or avoid another device and helps prevent an unintentional touch of any of the devices.

Other arrangements are also possible. For example, the encoders located closest to the top of the touchscreen may extend beyond the top edge of the touchscreen and/or the encoders located closest to the bottom of the touchscreen may extend beyond the bottom edge of the touchscreen. Alternatively the encoders do not have to be staggered and could be located equidistance from the edge of the touchscreen.

The lighting controller may also include a number of tactile input controls, such as sliders and buttons. The lighting controller of FIG. 1 includes 20 sliders across the top of the lighting controller, divided into two groups of ten, and 4 sliders near the lower corners of the lighting controller, divided into two groups of two. In addition, there are a number of buttons, including buttons located between the two groups of sliders at the top of the lighting controller and additional buttons arranged around the touchscreen. The functions of the sliders and buttons are determined by the operating context of the lighting controller.

The lighting controller may also include connectors or ports for receiving commands, triggers, inputs or other data from an external source or system including serial ports, parallel ports, midi ports, and Ethernet connectors.

User Interface Module

Figure 2:
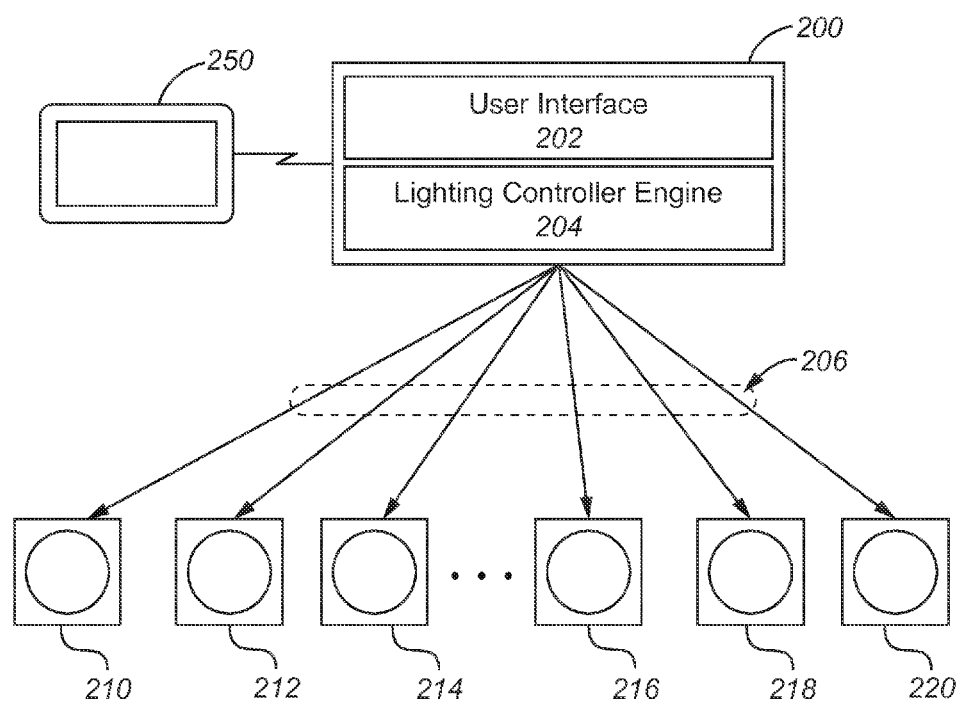
FIG. 2 is a block diagram illustrating software modules for an exemplary lighting controller.

FIG. 2 is a block diagram illustrating an exemplary operating environment. The lighting controller 200 controls a number of lighting fixtures 210-220 by sending various commands or control signals. The signals may be communicated via a variety of types of wired or wireless connections 206. The lighting controller includes a lighting controller engine 204 and a user interface module 202 and supports an optional handheld computing device 250. The user interface module is customizable so that the user interface may be adapted for different applications or for different users. The user interface module provides the user with an intuitive interface so that the user may specify descriptive values, absolute or relative values for the desired results, which the lighting controller engine then translates into the absolute or fixture-dependent values needed to control the lighting fixtures. The user interface module insulates a user from having to calculate the exact values needed to control the lighting fixtures or to take into account differences between lighting fixtures. For example, a user may specify a color for a lighting fixture, such as purple by adjusting one of more input controls, and the lighting controller engine determines the color component values to send to the lighting fixture. If the user specifies the same effect for multiple lighting fixtures that have different control interfaces, then the lighting controller engine determines the values to send to each of the different lighting fixtures.

The user interface module defines an operating context for the lighting controller. The operating context impacts the information that is displayed on the touchscreen, as well as the functions associated with the tactile input controls on the console, such as the encoders, sliders and buttons. In one implementation, there are four user-selectable contexts: 1) select, 2) control, 3) record, and 4) play. The select context allows the user to select specific lighting fixtures. The control context allows the user to change the attributes for the selected lighting fixtures to create a lighting state. The record context allows the user to record one or more lighting states in a playlist or to assign a lighting state to a slider. The play context allows the user to edit or play a recorded playlist.

When recording a lighting state, the user may specify how an external stimulus may alter or control an attribute of a lighting state using a command language provided by the lighting controller engine. The external stimulus may be provided by a time of day clock, an occupancy sensor, an ambient light sensor, a remote switch, or other type of device.

Depending upon the context, there may be more than one page of information to be presented to the user. If so, then the user may navigate through multiple pages of information on the touchscreen. It is possible that the functions assigned to the input controls may be different for different pages.

Figure 4:
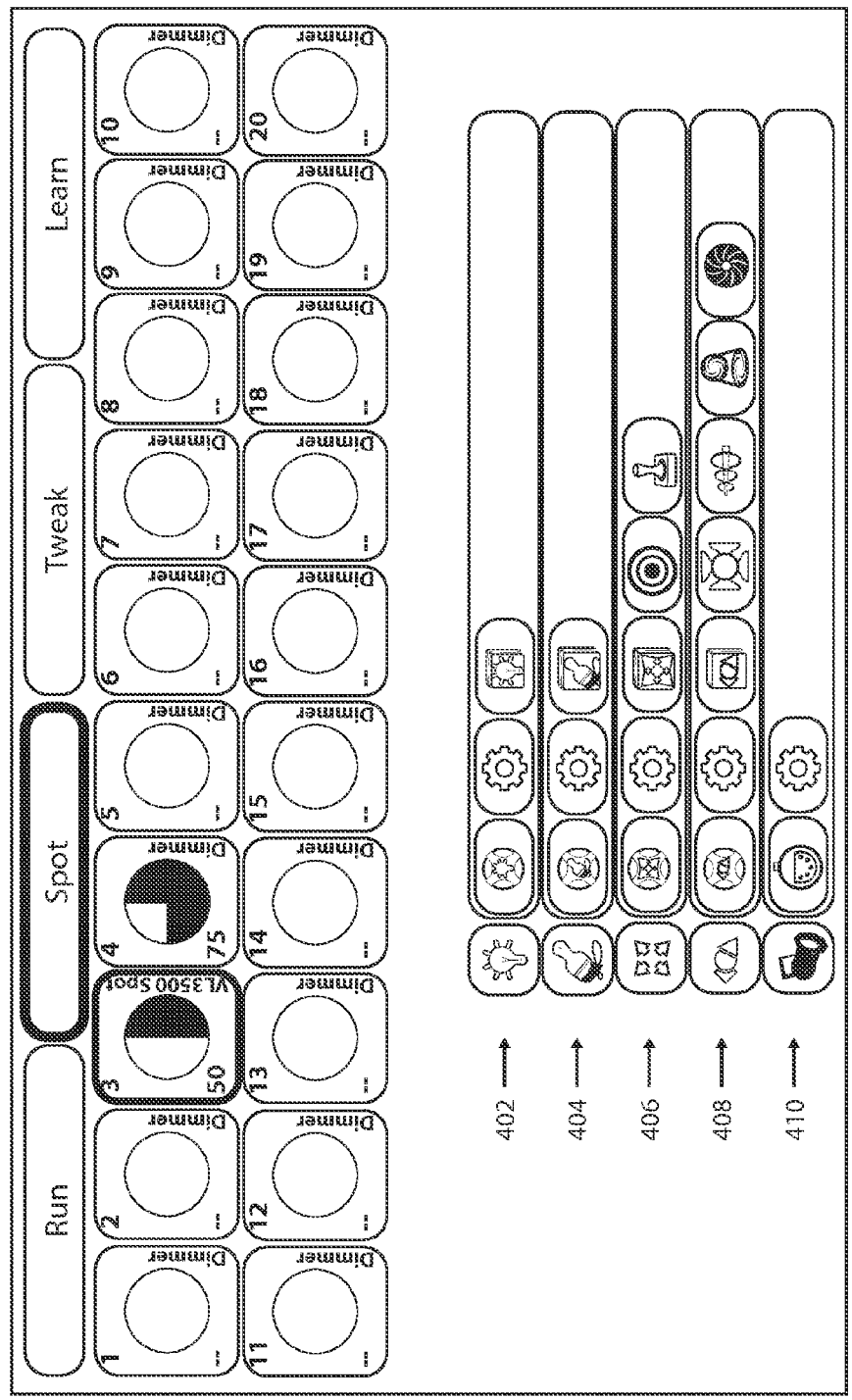
FIG. 4 illustrates an exemplary display on a touchscreen of the lighting controller.
Figure 9:
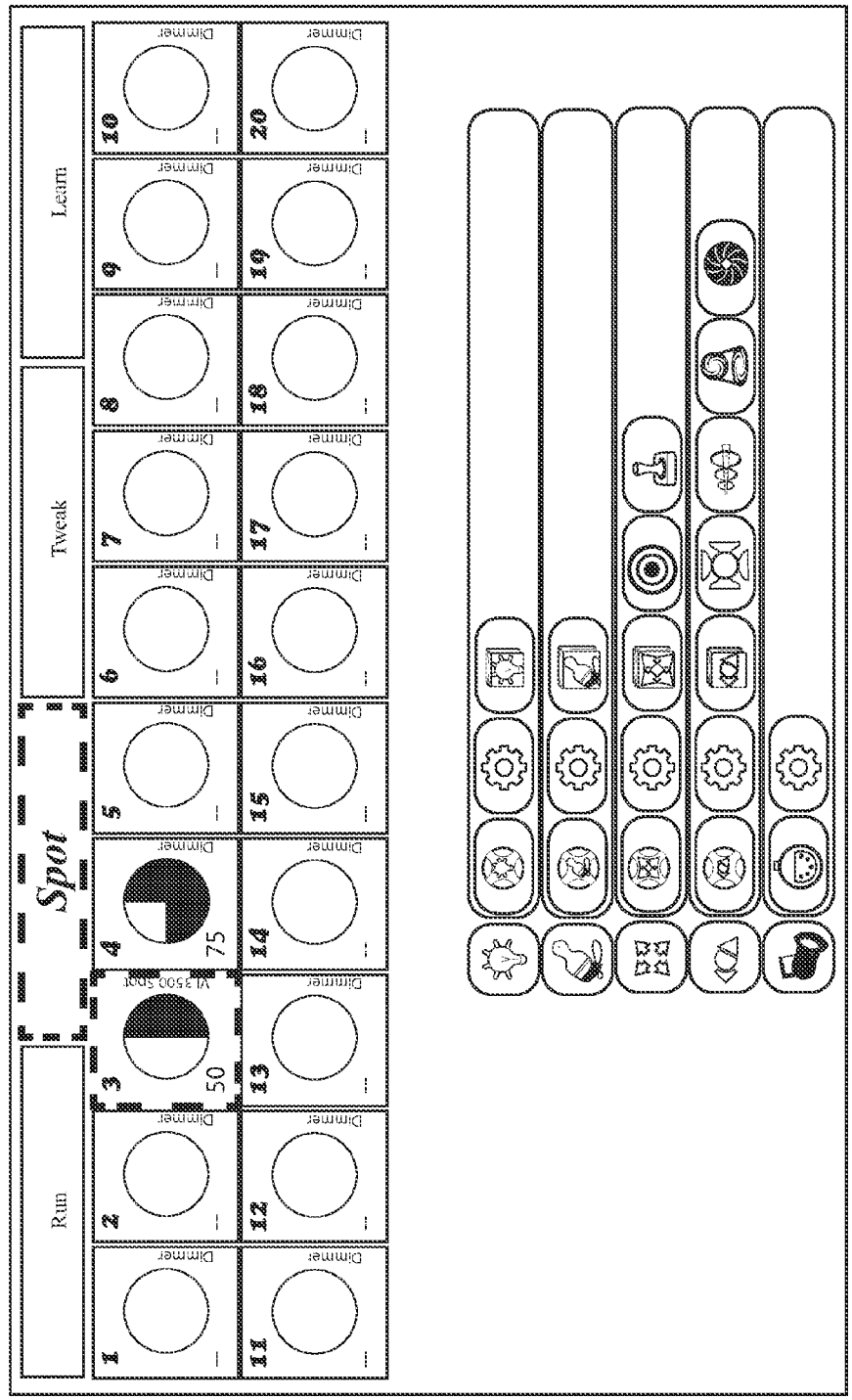
FIG. 9 illustrates an exemplary display on a touchscreen of the lighting controller.
Figure 10:
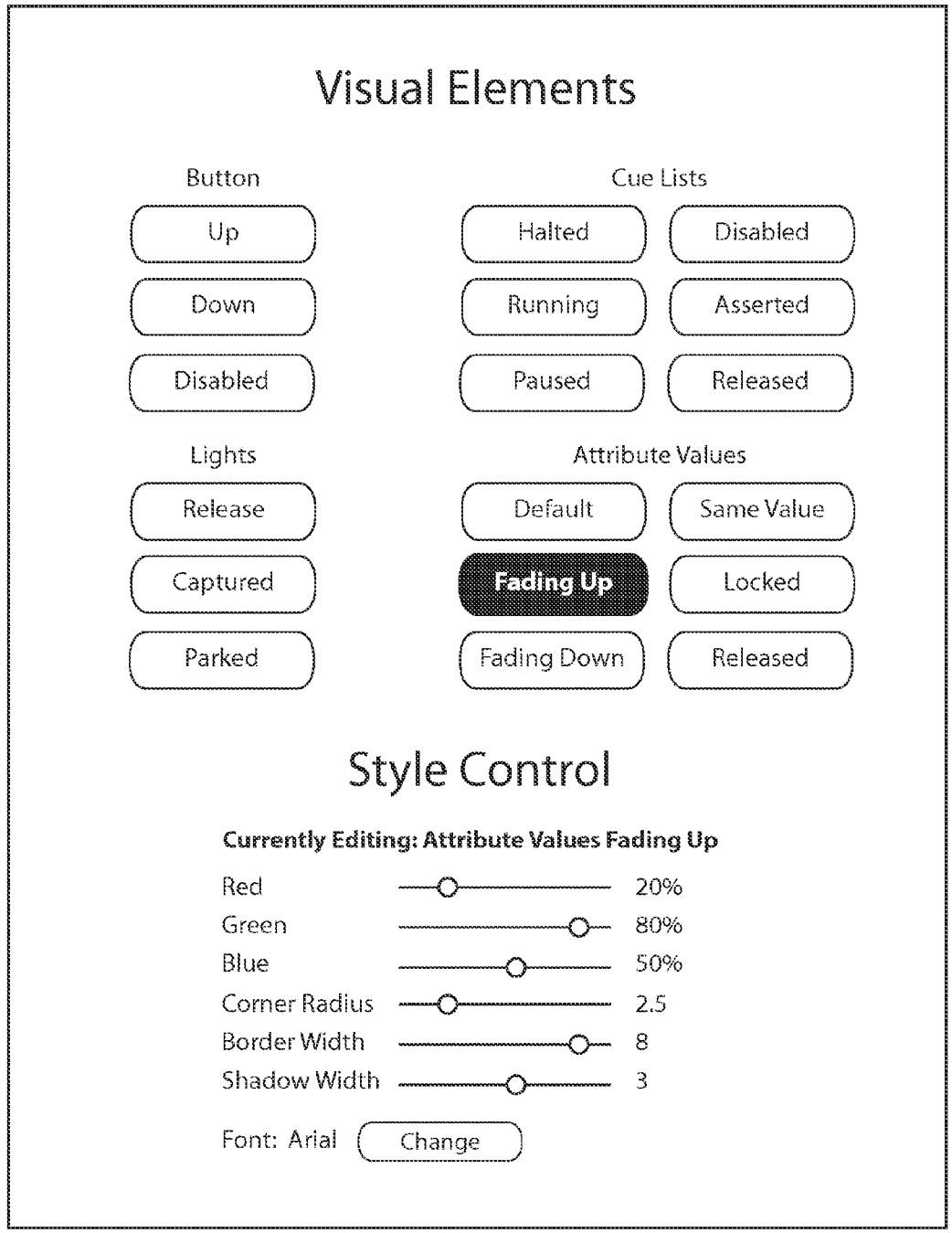
FIG. 10 illustrates an exemplary interface for configuring graphical elements on a touchscreen of the lighting controller.

The user interface module allows the user interface to be customized without requiring replacement of the lighting controller engine. The drawing of graphical elements on the display may be modified to allow the lighting controller to be targeted to a variety of markets through changes in the way the graphical elements are drawn without requiring a change in the underlying software. For example, FIGS. 4 and 9 show different user interfaces tailored to different user preferences or different application environments. FIG. 10 is an example of a tool used to configure the appearance of the user interface. As shown in FIG. 10 fundamental colors, gradients, fill patterns, outlines, corner radius and border width may be set for a multitude of screen elements. The screen elements include at a minimum, the items shown in the upper section of the screen in FIG. 10 below the heading "Visual Elements".

The lighting controller engine and the user interface module may be implemented using any combination of computer hardware and software. Any software may be stored as computer-executable instructions on a computer-readable medium. The lighting controller may include one or more processing devices for rendering the user interface, translating descriptive values into fixture-dependent values, etc., as well as one or more memory devices for storing information about the fixtures, the lighting states, etc. Communications between the lighting controller engine, the user interface module, the handheld device, and the lighting fixtures may use any combination of wired and/or wireless communication.

Context for Controlling Lighting Fixture Attributes

The control context allows the user to control the attributes for the lighting fixtures. Within the control context, there are attribute families and within each attribute family, there are attributes. In one implementation, there are four attribute families: 1) intensity, 2) color, 3) position, and 4) shape. The intensity family includes attributes, including, but not limited to, intensity and strobe. The color family includes attributes, including, but not limited to, color space, colors within the color space, color hue, color saturation, color temperature, color wheel, etc. The position family includes attributes including, but not limited to, pan, tilt, position, spin, etc. The lighting controller engine converts the position attributes into fixture-dependent values that specify rotation, inclination or directional light beam values.

The shape family includes attributes including, but not limited to, gobo, zoom, shutter, iris, frost, focus, etc. The lighting controller engine converts the shape attributes into fixture-dependent values that specify shutter angle or shutter occlusion of the aperture or aperture size or gobo shape or zoom magnitude or focus of the light beam or frost of the light beam.

Figure 3:
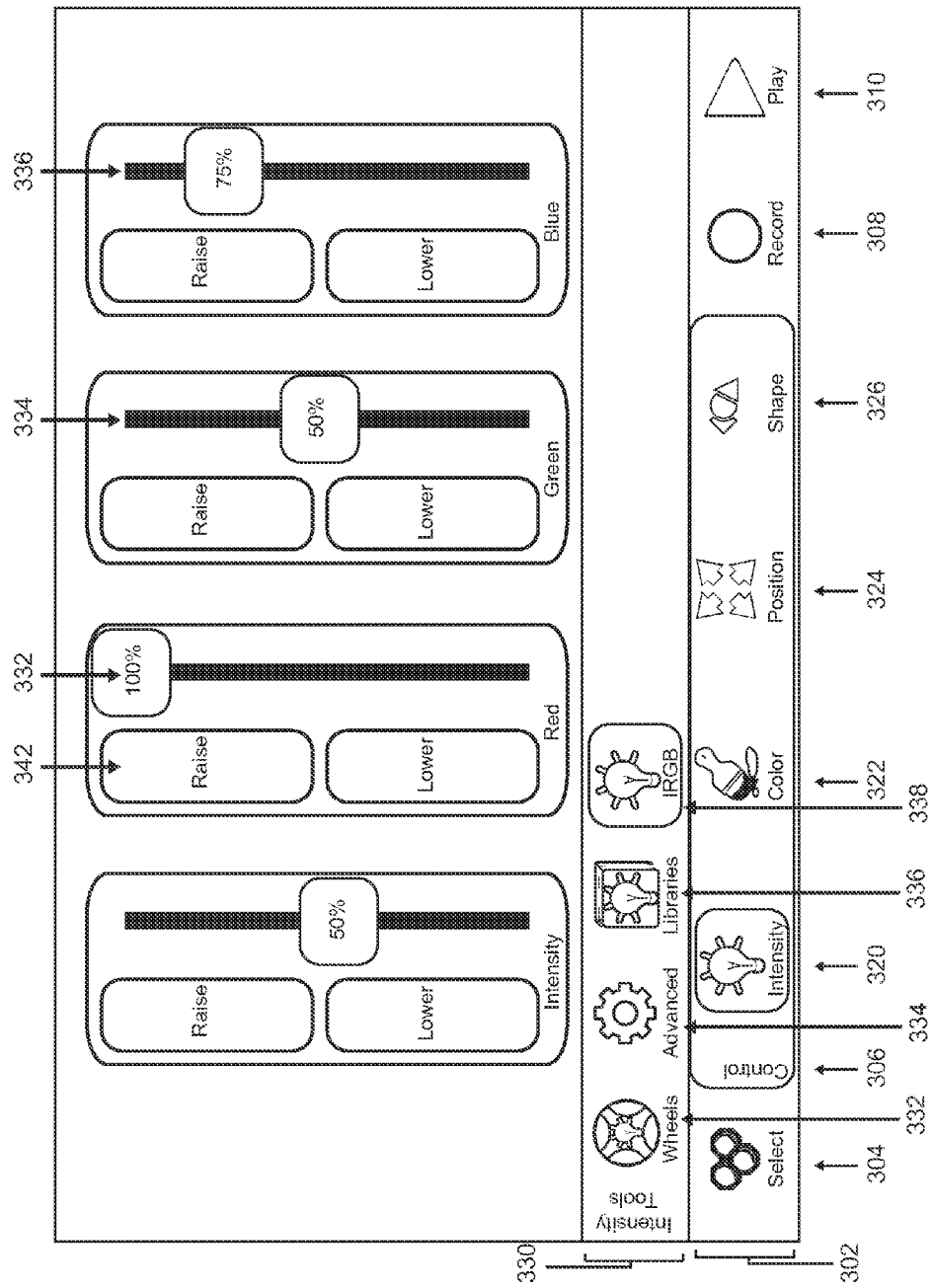
FIG. 3 illustrates an exemplary display on a touchscreen of the lighting controller.

The user interface module may present the attribute families as graphical groupings that expand and contract in an animated fashion to convey to the user the hierarchical nature of the fixture control. When the user selects an attribute family, the user interface module presents the user with additional control options for the attributes within the family. FIG. 3 shows a context selection ribbon 302 that includes controls for the select context 304, the control context 306, the record context 308, and the play context 310. FIG. 3 illustrates that once the control context is selected, the attribute families for the control context are displayed. The attribute families include intensity 320, color 322, position 324, and shape 326. FIG. 3 also illustrates that once the intensity attribute family 320 is selected, the appropriate intensity tools are displayed in a ribbon or toolbar 330. The intensity tools include a wheels tool 332, an advanced tool 334, a libraries tool 336, and an intensity red green blue (IRGB) tool 338. The wheels tool assigns intensity control to the encoders. The advanced tool allows the user to make advanced intensity adjustments, such as locking the intensity attribute so it can not be inadvertently changed. The libraries tool allows the user to choose from a number of previously defined intensity palettes. The IRGB tool allows the user to make relative or absolute color adjustments. The portion of the display above the intensity ribbon reflects the user's selection of the IRGB tool and allows the user to make relative color adjustments as described in more detail in the section entitled Color Control.

In an alternative implementation the contexts include 1) spot, 2) run, 3) tweak, and 4) learn. The spot context allows the user to select and control certain lighting fixtures. The run context allows the user to play a saved playlist. The tweak context is used to setup the lights and operational parameters. The learn context is used to provide interactive help documentation for operation. In this implementation, when the spot context is selected, the user interface module presents the user with the attribute families and an associated ribbon or toolbar for each attribute family. FIG. 4 shows the intensity family and its associated ribbon or toolbar 402, the color family and its associated ribbon or toolbar 404, the position family and its associated ribbon or toolbar 406, the shape family and its associated ribbon or toolbar 408, and the setup function and its associated ribbon or toolbar 410.

The intensity family is associated with an orange light bulb and includes tools represented by a wheel, a gear, and a book. The wheels tool assigns intensity control to the encoders. The gear tool allows advanced intensity adjustments and the book tool allows a selection of a previously defined intensity palette.

The color family is associated with a paintbrush. The wheels tool in this family assigns color controls to the encoders. The wheels tool in this grouping includes a brush, which differentiates it from the wheels tool in the first grouping which includes a light bulb. The gear tool allows settings to be performed on color. Note that the gear tool is a different color in this grouping than in the first grouping. The use of the appropriate attribute family graphic, such as the light bulb and the paintbrush, and different colors help differentiate the controls between the different groupings. The book tool provides previously defined color palettes.

The position family is associated with a set of four arrows. The wheels tool in this family includes a set of arrows and assigns position controls to the encoders. The gear tool allows settings to be performed on position attributes. The book tool provides previously defined position palettes. The bull's-eye tool provides absolute positioning and the joystick tool provides relative positioning.

The shapes family is associated with attributes that modify the shape, pattern, texture, size and focus of the light beam or projected light. The wheels tool in this family includes the shape and assigns shape control to the encoders. The gear tool allows settings to be performed on shape attributes. The book tool provides previously defined shape palettes. The shutters tool provides shutter adjustment. The lens tool provides focus and zoom adjustment. The projected gobo tool provides gobo control. The iris tool provides iris adjustment.

The setup functions provide fixture setup operations, such as assigning addresses, fixture type, and other types of setup information.

Figure 5:
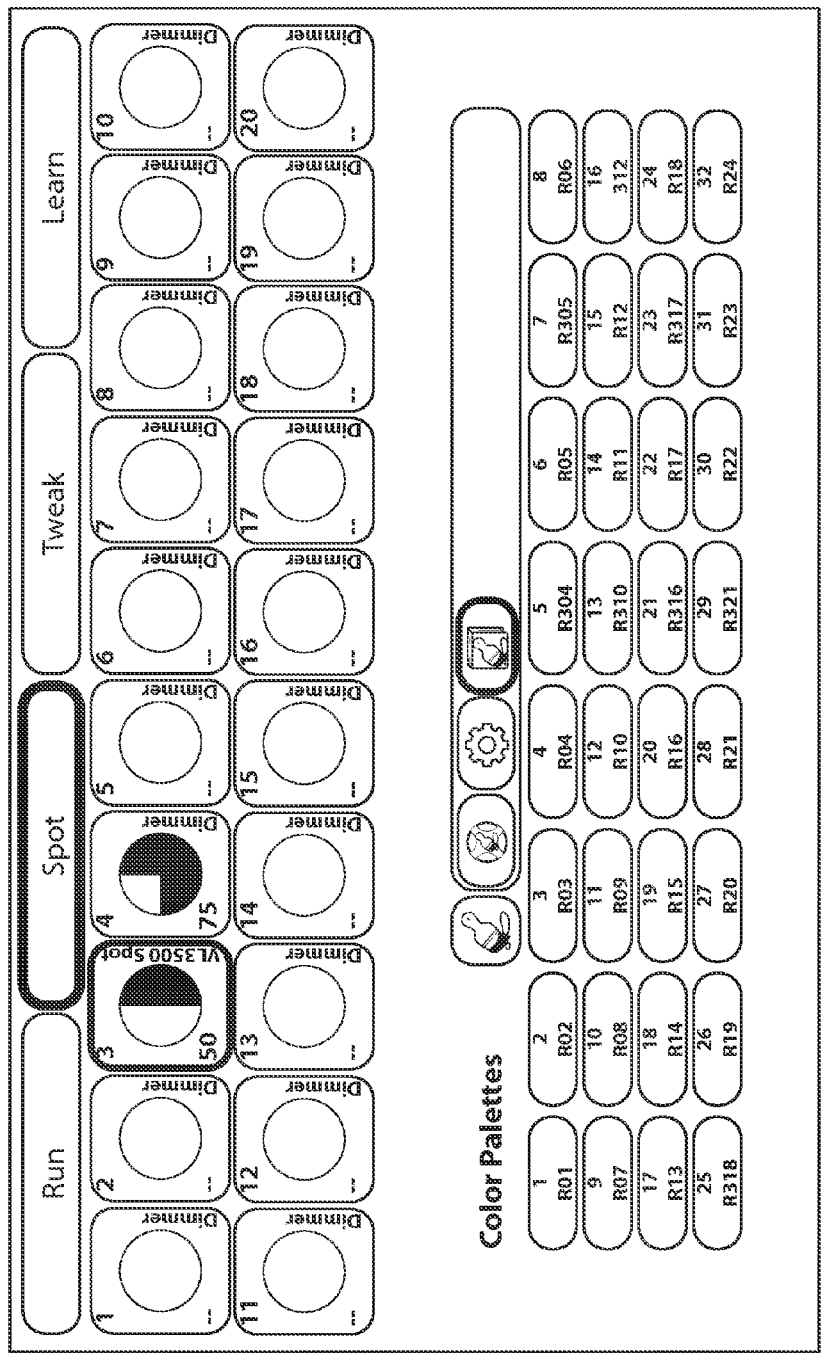
FIG. 5 illustrates an exemplary display on a touchscreen of the lighting controller.

The user can select an attribute family by selecting the family or any tool within the family. When a family is selected, the ribbon or toolbar for that family moves in an animated fashion to a position of prominence while the ribbons for the other attribute families are removed from the display in an animated fashion. With the ribbon for the selected attribute family in a position of prominence and all other ribbons removed, additional space becomes available to facilitate control of the attributes within the family. For example, if the book tool from the color family is selected from the display of FIG. 4, then the display transitions to the display of FIG. 5, which includes the ribbon or toolbar for the color family and selected color palettes. If the user selects one of the colors from the color palette, then the lighting controller engine determines the fixture-dependent values needed to produce the selected color. When control of the attributes within the family is complete, the user may dismiss the currently selected family and initiate a sequence that performs an animated transition back to the starting state where all the families are once again simultaneously displayed.

Figure 6:
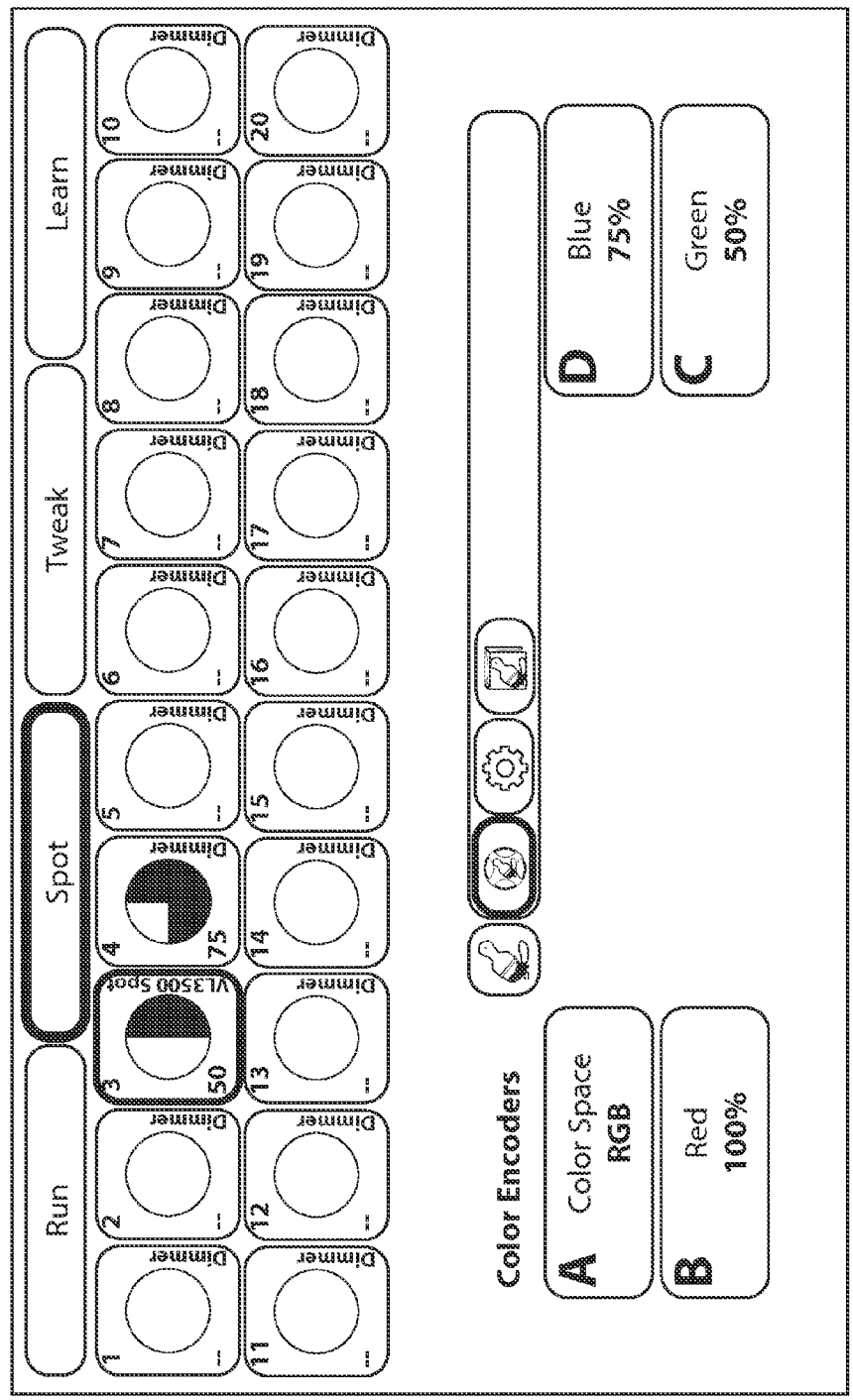
FIG. 6 illustrates an exemplary display on a touchscreen of the lighting controller.

FIG. 6 illustrates another example where the user wants to change a color attribute for a lighting fixture. In this example, the user is adjusting the attributes for lighting fixture 3. Information describing the current attributes for lighting fixture 3, as well as information about the type of fixture are displayed near the image representing lighting fixture 3. The display also shows the states of lighting fixtures 1-2 and 4-20 even though the user is not currently adjusting the attributes for these fixtures since these lighting fixtures are associated with the current lighting state. FIG. 6 also shows the functions associated with the encoders, which are based on the selected context and attribute, as well as the attributes and/or values supported by lighting fixture 3.

Color Control

The user may control color by specifying a relative color value or by changing a color component in a relative manner. In one aspect of the invention, the color controls operate by either adding the specified color component, removing an unspecified color component or both adding the specified color component and removing an unspecified color component. For example, in a red, green, blue color space, when the user indicates that more red is needed, the amount of red color in the light beam is increased. The amount of apparent red light can be increased in one of several ways, by (a) increasing the red component, (b) decreasing the blue and green components, or (c) increasing the red component and decreasing the blue and green components. The manner in which the amount of red color is increased is transparent to the user, i.e., the user does not know whether the lighting controller engine specifies an increase in the red color component, a decrease in the blue and green color components, or a combination of the two.

FIG. 3 shows input controls on the display screen for controlling the amount of red, green and blue light. The red, green and blue sliders 332, 334, 336 indicate the absolute value of each color component while the Raise and Lower buttons next to each slider allow the user to increase or decrease the corresponding color component in a relative manner. When applying a relative increase to red by pressing the red Raise button 342, if the amount of red is not at a maximum level, then the red color component is increased and the position of the slider will move toward its maximum. In some implementations, the amount of blue and green color components are decreased in addition to increasing the red color component. If the amount of red color is to be increased and the amount of red is already at a maximum level as shown in FIG. 3, then the blue and green color components are decreased so that the amount of apparent red light is increased. Applying a relative decrease of a color component works in a complementary manner.

For an LED fixture with red, green and blue LED emitters, increasing the red component increases the output of the red emitter, which causes the overall intensity to increase. Once the red emitter is at its maximum output, then further requests to increase the red component result in reducing the green and blue components, which in turn results in a perceived increase in red with a decrease in overall intensity.

Other implementations may use other types of controls other than a pair of relative adjustment buttons. For example, a slider or wheel could be used where a movement up or clockwise increases a color component and a movement down or counterclockwise decreases the color component in a relative fashion.

This method of control optimizes relative color changes and is more intuitive when trying to make relative color adjustments than trying to adjust absolute red, green and blue values. Although FIG. 3 illustrates a red, green, blue color space, the user interface module and the lighting controller engine support other color spaces such as cyan-magenta-yellow or hue-saturation-luminance, as well as supporting lighting fixtures that adjust color using a color wheel.

Once a lighting state is defined for one or more lighting fixtures, it can be recorded by selecting the record context. It may also be associated with a control, such as a slider or other input control. The play context may be used to play back the lighting state. If the lighting state was assigned to an input control, then when the user selects the play context, the input control may be used to playback the lighting state.

Graphical Help Overlays

Figure 7:
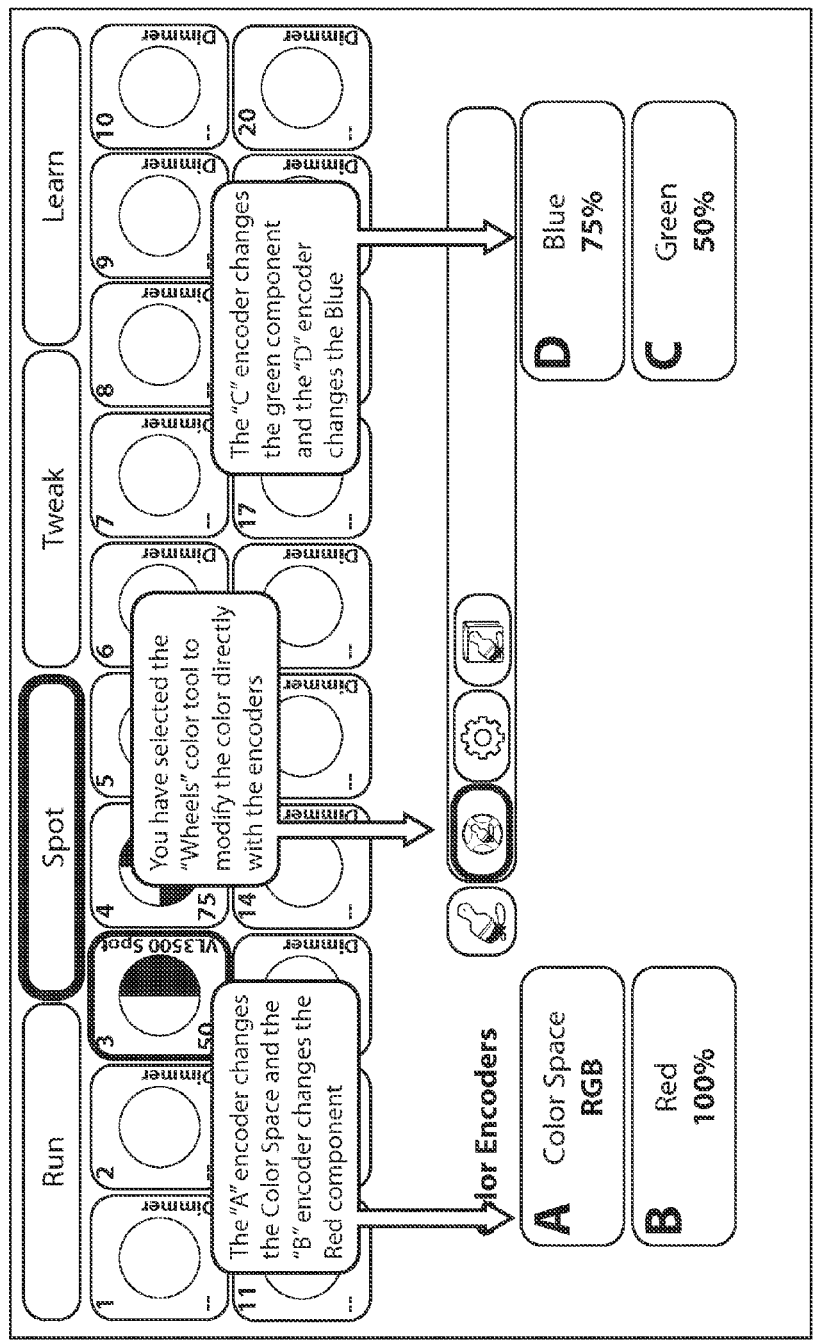
FIG. 7 illustrates the display of FIG. 6 with help overlays.

The user interface module may provide integrated help functions superimposed over the primary operational display to assist the user. The help functions are in the form of one or more overlays and can employ opaque, transparent and semi-transparent areas to annotate, label, describe and guide the user in the operation of the current interface display. These help overlays can be activated and hidden dynamically to provide the user with flexibility in invoking and displaying the overlays over the current operational display. The help overlays change appearance based on the user's operational context of the controller and do not inhibit regular operation of the lighting controller. For example, FIG. 6 illustrates the touchscreen controls without any help overlays and FIG. 7 illustrates the touchscreen with the help overlays, which in this example provide additional information about the functions of the encoders.

Dynamic Fixture Details Based on Zoom Level

Another aspect of the invention displays groupings of lighting fixtures and dynamically determines what information to display for each fixture based on the number of fixtures in the group. This aspect of the invention adjusts the level of detail of the information presented for each lighting fixture on the display dynamically based on the user's adjustment of the number of lighting fixtures shown on the display, i.e., the zoom level for the display. If the user zooms out, then the components are not just scaled down in size, but the detail is either re-represented in a more compact form or omitted completely for clarity.

Figure 8:
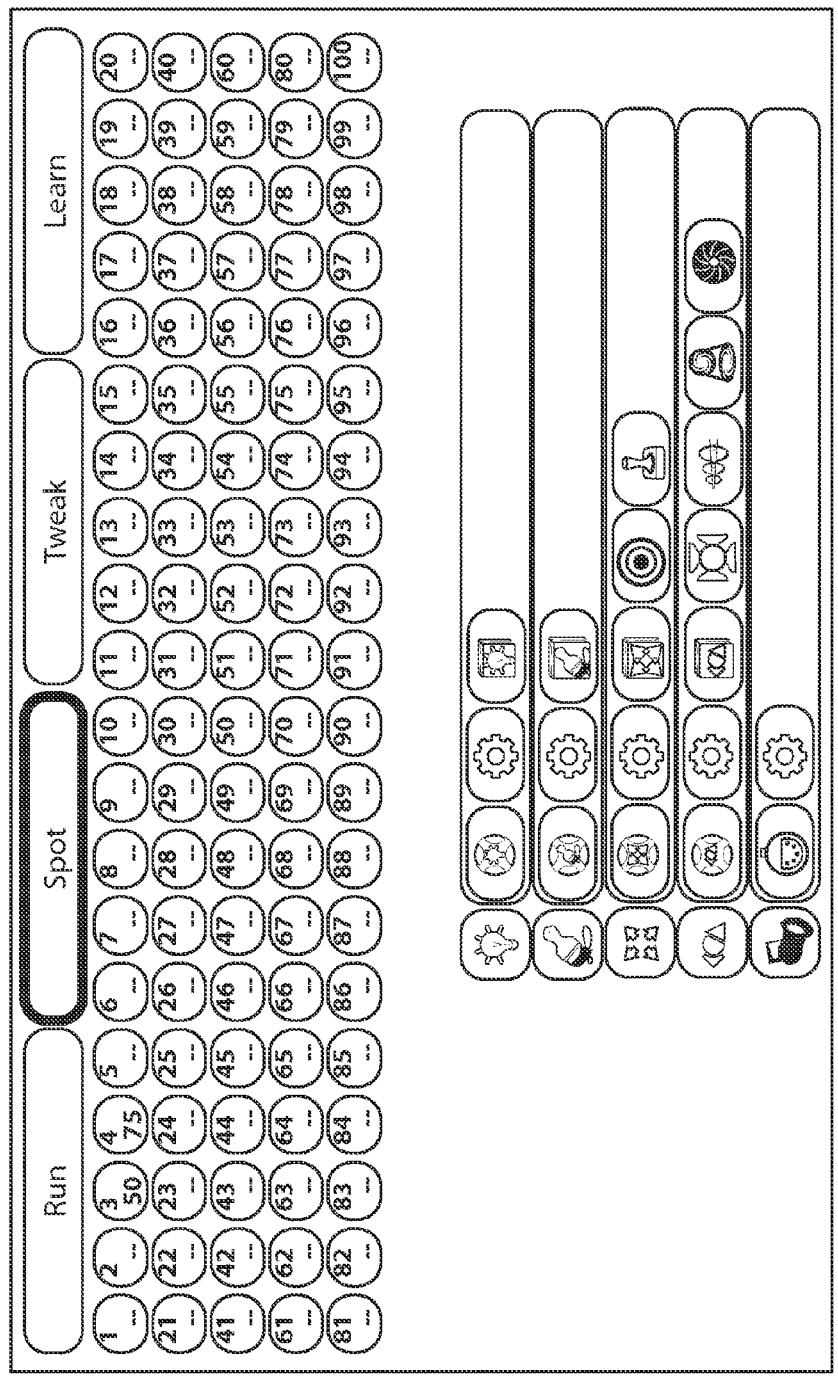
FIG. 8 illustrates the display of FIG. 4 at a different zoom level.

For example, FIGS. 4 and 8 illustrate different displays for different zoom levels. FIG. 4 displays a group of 20 fixtures numbered 1-10 and 11-20, along with additional information about the fixtures, such as the presence of a dimmer or the type of fixture. FIG. 8 displays a group of 100 fixtures numbered 1-100, but does not provide any fixture-type or color information about the individual fixtures.

Smooth Transitions for Multi-Attribute Lighting Fixtures

A common function of lighting controllers is the ability to manually adjust the parameters of the lighting fixtures. When the lights being adjusted contain many attributes, the adjustment process can be time consuming. In a performance setting, it is desirable to adjust the lights a certain way, instruct the controller to hold the lights at their current value, change the settings of the lights "off-line", so these changes are not viewed on the lights, and then initiate a change whereby the lights are smoothly transitioned from the current state to the new state. Existing lighting controllers provide this function only for the intensity attribute of lighting fixtures.

In one aspect of the invention the lighting controller supports the manual configuration of multiple attributes for a set of fixtures, the activation of a process that holds the lights at their current values, and a smooth transition to a new manual configuration of the fixtures.

For example, a user defines multiple attribute values for a first state and defines a second state with different attribute values. The lighting controller controls the transition from the first state to the second state so that the transition is smooth and natural. If the color in the first state has more red than the color in the second state, then the lighting controller controls the transition so that the red color is gradually lessened. Other attributes are controlled in a similar manner.

Lighting Controller with Dynamically Determined Playback Functionality

Although existing lighting controllers have the capability to playback a series of saved lighting states sequentially, the user is required to manually set up the playback. To relieve the user from manually setting the playback information, another aspect of the lighting controller automatically determines the playback details from the set of user controls that are assigned to the lighting sequence.

Figure 16:
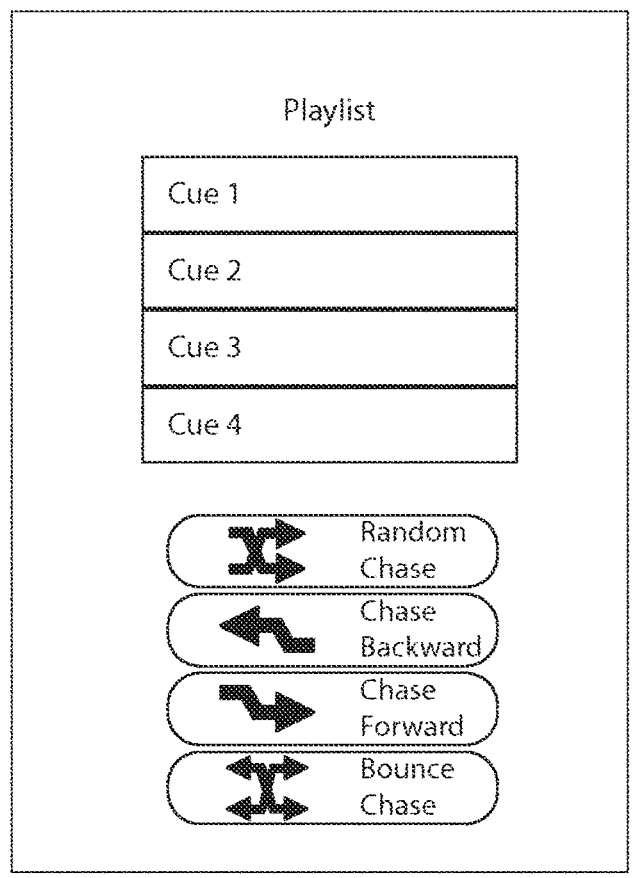
FIG. 16 illustrates an exemplary display on a touchscreen of the lighting controller.

The lighting controller plays back a series of saved lighting states sequentially, where the playback methodology is determined by the functionality of the user selected controls assigned to the saved sequence. For example, the user may record four lighting states, define a sequence and select an input control to automatically play back the sequence in a particular manner. If the user selects an input control for a chase and a chase direction, then the lighting controller initiates a chase sequence in that direction. To alter the direction of the chase, the user may simply select a different direction. FIG. 16 illustrates one possible set of input controls for selecting the playback methodology.

Extension to a Handheld Computing Device

Although some existing lighting controllers have associated applications that operate on handheld computing devices, these applications only allow very simple manipulation of data in the lighting controller. Another aspect of the invention expands the actuators and control surface of the lighting controller to a handheld computing device. This aspect of the invention utilizes a handheld computing device as an extension of the physical controller (or on-screen representation of the physical controller) and uses that device to extend the physical control surface, whereby the lighting controller and device work together to provide a unified interface. Pressing a button on a display of the handheld computing device affects the lighting controller in the same way as if the corresponding tactile button were pressed on the console or the corresponding displayed control were pressed on the touchscreen of the console.

Figure 11:
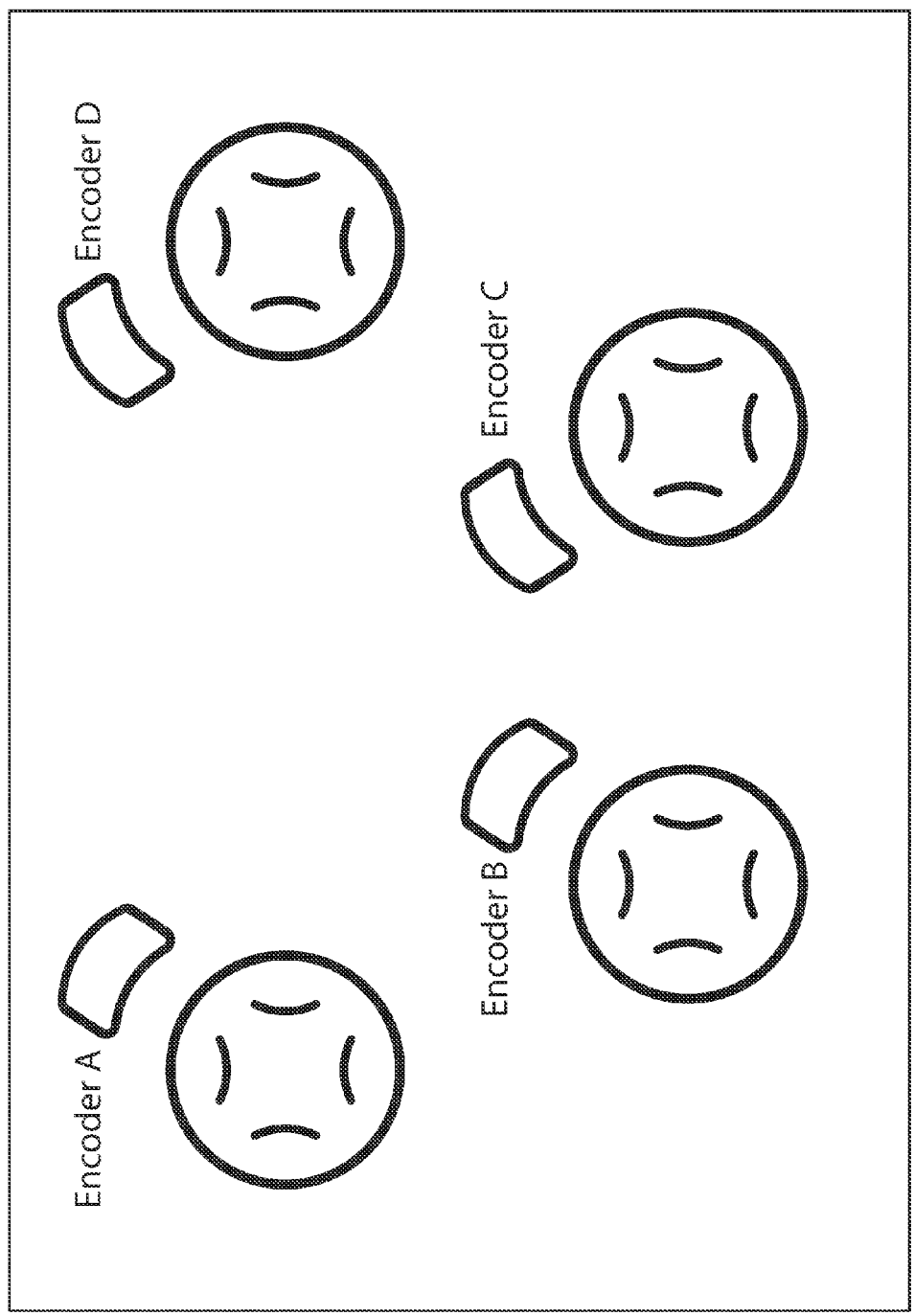
FIG. 11 illustrates an exemplary display on a handheld computing device.
Figure 12:
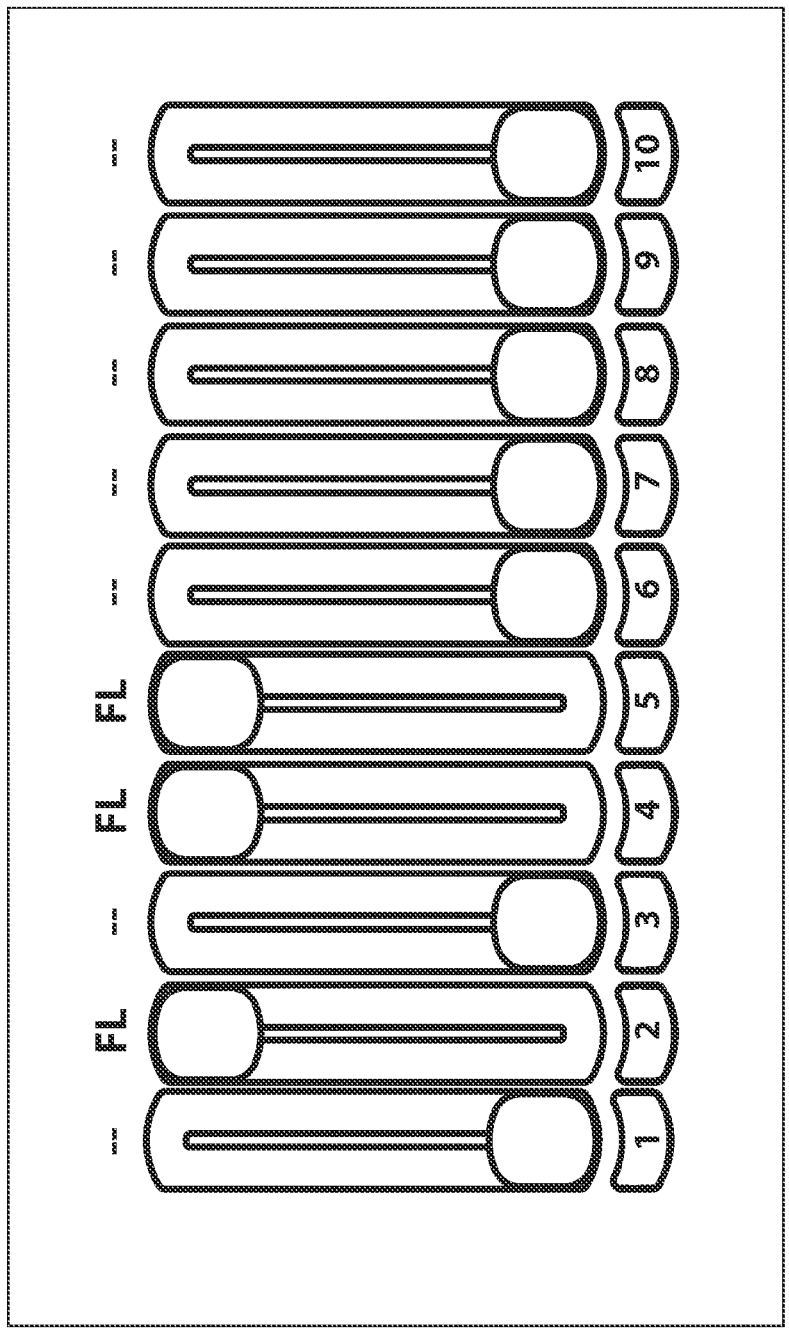
FIG. 12 illustrates an exemplary display on a handheld computing device.

FIG. 11 illustrates encoders displayed on the handheld computing device. Adjusting one of the encoders displayed on the handheld computing device produces the same result as adjusting the corresponding tactile encoder on the lighting controller. FIG. 12 illustrates sliders displayed on the handheld computing device. Adjusting one of the sliders displayed on the handheld computing device produces the same result as adjusting the corresponding tactile slider on the lighting controller. In one implementation, the extension to the handheld computing uses standard interfaces or components, such as those provided by the operating system running on the handheld computing device.

Figure 13:
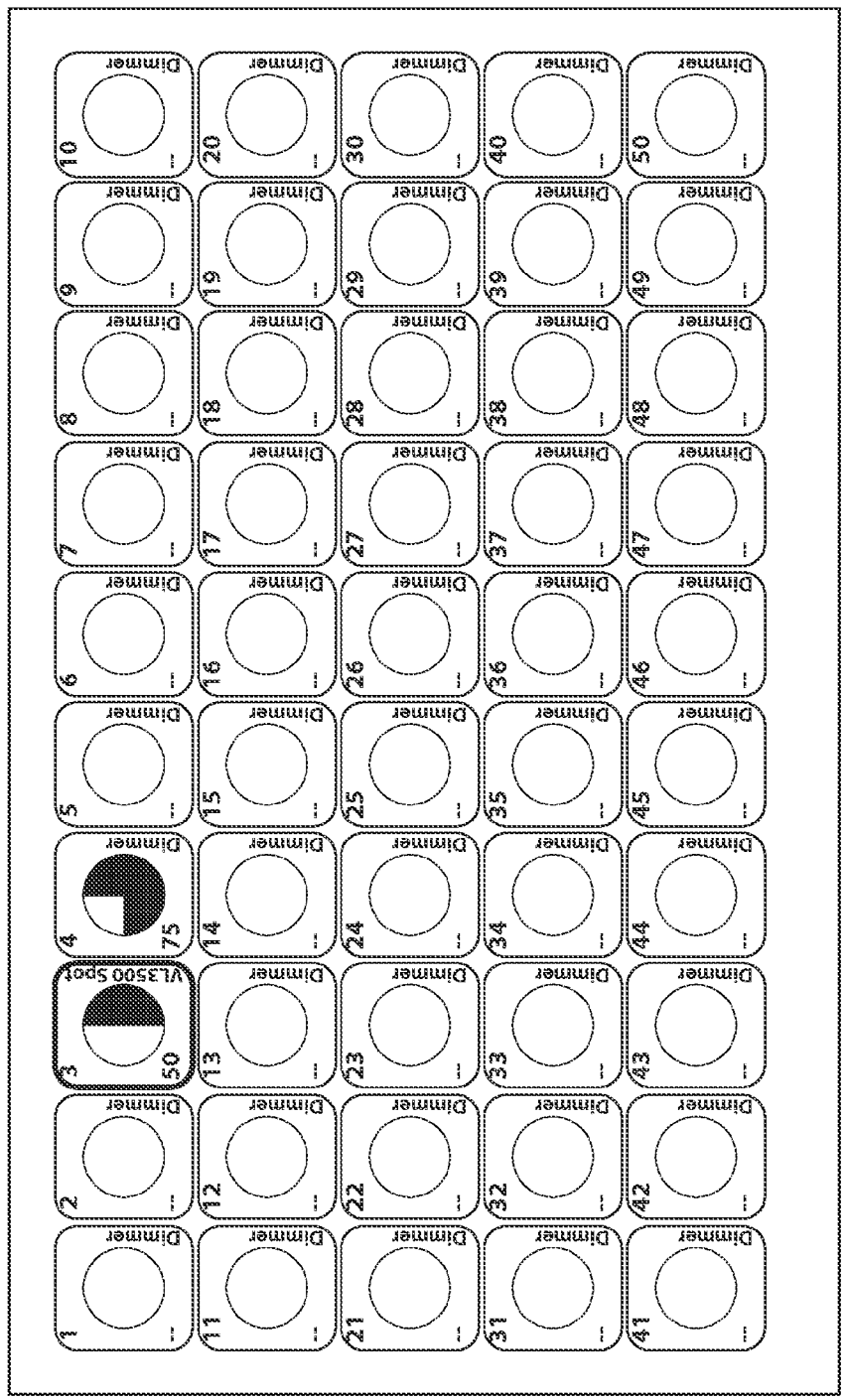
FIG. 13 illustrates an exemplary display on a handheld computing device.

The display capabilities of the lighting controller can also be expanded to the handheld computing device. The display of the handheld computing device and the display of the lighting controller may present a unified interface so that when a user presses a button on the lighting controller, the screen on the handheld computing device is updated appropriately. For example, FIG. 13 illustrates the display on the handheld computing device, which displays a grouping of 50 lighting fixtures, and which mirrors at least a portion of the display on the lighting controller. In some instances the display on the handheld computing device acts as a secondary monitor.

Another implementation uses the 3D sensors in the handheld computing device such as accelerometers and gyroscopes to allow relative movement of the physical device to control attributes of lighting fixtures. For example, when the user tilts the handheld computing device forwards or backwards, the motion is interpreted as an adjustment of the tilt attribute of a yoked moving lighting fixture. When the user tilts the handheld computing device side-to-side, then the motion is interpreted as an adjustment to the pan attribute of the lighting fixture.

Identifying Saved Lighting States

Figure 14:
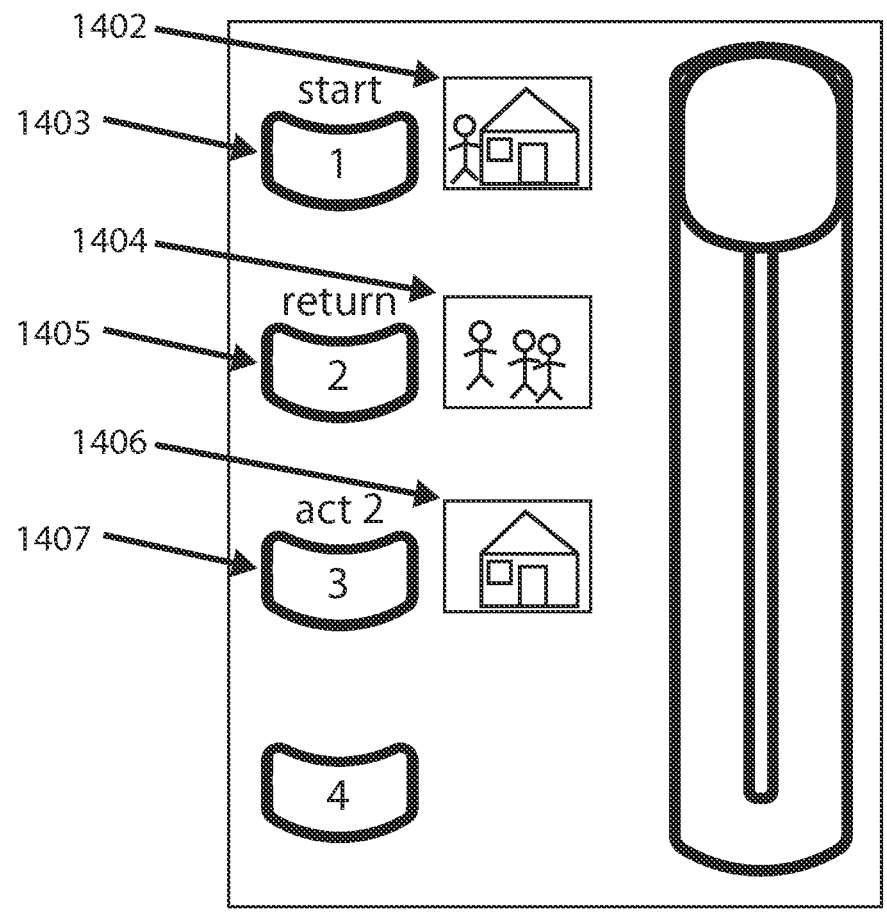
FIG. 14 illustrates an exemplary display on a handheld computing device.
Figure 15:
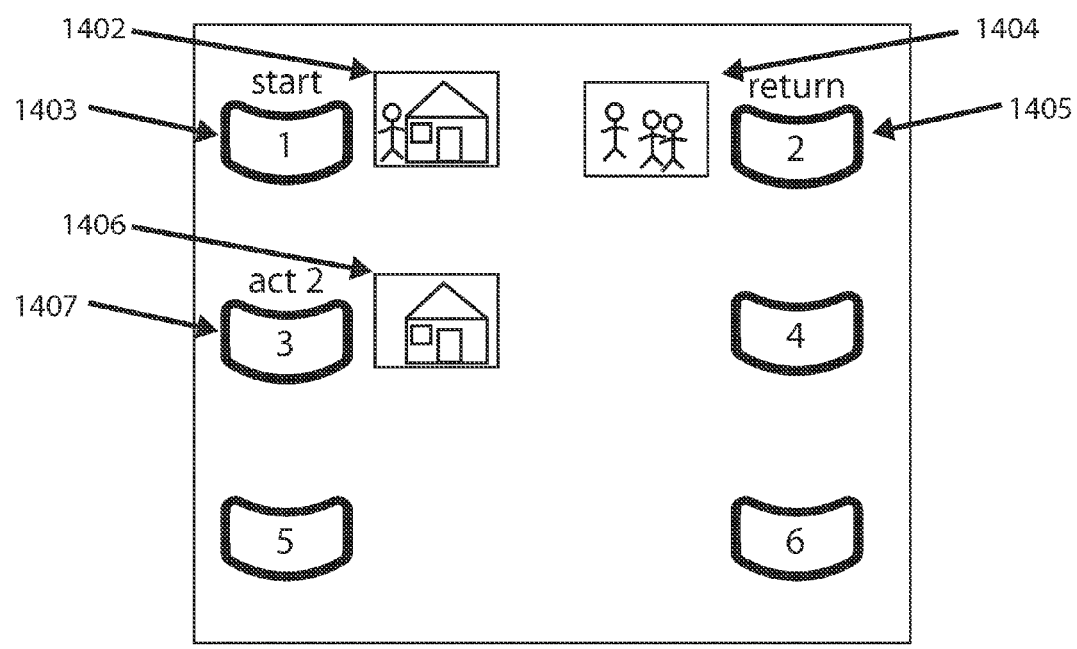
FIG. 15 illustrates an exemplary display on a handheld computing device.

Another aspect of the invention uses a photograph from a digital camera, handheld computing device, smartphone, or other device to identify the operation of a particular input control or to preview an operational lighting state. A photograph may be used in concert with the available lighting controls on the display to allow the user to preview the lighting scene before actuating it. In a situation where lighting scenes are recalled sequentially, this photograph can assist the user in knowing when to advance the lighting sequence based on other physical items in the scene, such as people or theatrical set pieces. In a situation where lighting scenes are recalled in non-sequential order, the photograph provides a preview of the effect of recalling a saved lighting scene. Camera and photo capturing software may be integrated into the software for the lighting controller or may be separate. For example, FIGS. 14 and 15 illustrate two different examples of the use of photographs to identify the lighting states associated with the input controls 1403, 1405, 1407 next to the photographs 1402, 1404, 1406. When the input control labeled start 1403 is selected, then the lights are set up to replicate the lighting scene shown in the corresponding photograph 1402.

The foregoing is provided for purposes of illustrating, describing, and explaining aspects of the present invention and is not intended to be exhaustive or to limit the invention to the precise forms disclosed. Further modifications and adaptation of these embodiments will be apparent to those skilled in the art and may be made without departing from the scope and spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. For example, the physical layout of the lighting controller or of the input controls of the lighting controller may differ from those described herein. In addition, the lighting controller engine and the user interface module may operate on a standard computing device instead of a lighting controller console or may operate on a device with a display, but no tactile controls.

What is claimed is:

1. A method for adjusting a color of at least one lighting fixture using a lighting controller, comprising:
   presenting a user interface that displays color components for the color of the at least one lighting fixture by displaying an indication of a value of a first color component, an indication of a value of a second color component, and an indication of a value of third color component;
   receiving an adjustment of the color for the at least one lighting fixture, wherein the adjustment indicates a relative increase or decrease of a selected one of the color components;
   based on the received adjustment, determining how to adjust the selected color component and the unselected color components;
   when the determination is to increase the amount of the selected color component, then increasing the amount of the selected color component and maintaining an amount of the unselected color components;
   when the determination is to decrease the amount of each of the unselected color components, then decreasing the amount of each of the unselected color components and maintaining the amount of the selected color component; and
   when the determination is to increase the amount of the selected color component and decrease the amount of each of the unselected color components, then increasing the amount of the selected color component and decreasing the amount of each of the unselected color components.

2. The method of claim 1, wherein when the determination is to increase the amount of the selected color component, then adjusting the indication of the value of the selected color component to reflect the increase.

3. The method of claim 1, wherein when the determination is to decrease an amount of each of the unselected color components, then adjusting the indications of the values of the unselected color components to reflect the decrease.

4. The method of claim 1, further comprising:
   based on the received adjustment, determining a fixture-dependent value for each of the color components.

5. The method of claim 4, wherein the at least one lighting fixture includes a first lighting fixture and a second lighting fixture and the first lighting fixture has a different control interface than the second lighting fixture, and wherein determining a fixture-dependent value for each of the color components comprises determining a first set of fixture-dependent values for the first lighting fixture and a second set of fixture-dependent values for the second lighting fixture.

6. The method of claim 1, wherein the user interface further provides an input control for each of the color components that allows a relative adjustment of the corresponding color component.

7. The method of claim 1, wherein an external stimulus further provides an input control for the color components that allows an absolute or relative adjustment of the corresponding color component.

8. The method of claim 1, further comprising:
when the determination is to decrease an amount of the selected color component, then decreasing the amount of the selected color component and maintaining an amount of the unselected color components;
when the determination is to increase the amount of each of the unselected color components, then increasing the amount of each of the unselected color components and maintaining the amount of the selected color component; and
when the determination is to decrease the amount of the selected color component and increase the amount of each of the unselected color components, then decreasing the amount of the selected color component and increasing the amount of each of the unselected color components.

9. The method of claim 8, wherein when the determination is to decrease the amount of the selected color component, then adjusting the indication of the value of the selected color component to reflect the decrease.

10. The method of claim 8, wherein when the determination is to increase an amount of each of the unselected color components, then adjusting the indications of the values of the unselected color components to reflect the increase.

11. A method for adjusting an attribute of one or more lighting fixtures using a lighting controller, comprising:
receiving a selection of the one or more lighting fixtures, wherein each lighting fixture has a control interface;
receiving a selection of an attribute;
presenting a user interface that includes an input control for receiving a descriptive value for the attribute, wherein a range of descriptive values associated with the input control is based on a range of fixture-dependent values supported by the one or more lighting fixtures;
receiving a selected descriptive value for the attribute for the one or more lighting fixtures;
determining at least one fixture-dependent value for the attribute based on the selected descriptive value and the control interfaces for the lighting fixtures; and
providing the at least one fixture-dependent value to the lighting fixtures.

12. The method of claim 11, wherein receiving a selection of the one or more lighting fixtures, comprises:
receiving a selection of an operating context associated with lighting fixture selection;
in response to receiving the selection of the operating context associated with lighting fixture selection, presenting an input control for the selection of the one or more lighting fixtures.

13. The method of claim 11, wherein receiving a selection of an attribute comprises:
receiving a selection of an operating context associated with attribute selection;
in response to receiving the selection of the operating context associated with attribute selection, presenting an input control for the selection of a descriptive value for the attribute for the one or more lighting fixtures.

14. The method of claim 13, wherein presenting an input control for the selection of a descriptive value for the attribute for the one or more lighting fixtures, comprises:
presenting an input control for selecting an attribute family; and
presenting an input control for selecting an attribute tool within the attribute family, wherein selection of the attribute tool configures the input control for the selection of the descriptive value for the attribute for the one or more lighting fixtures.

15. The method of claim 11, wherein the selected descriptive value indicates a relative or absolute increase or decrease in a selected color component within a color space, and wherein determining at least one fixture-dependent value for the attribute based on the selected descriptive value and the control interface for the one or more lighting fixtures, comprises:
determining a fixture-dependent value for the selected color component and a fixture-dependent value for any non-selected color components within the color space for each of the one or more lighting fixtures.

16. The method of claim 15, wherein the one or more lighting fixtures include a first lighting fixture and a second lighting fixture and the first lighting fixture has a different control interface than the second lighting fixture, and wherein determining a fixture-dependent value for the selected color component and a fixture-dependent value for any non-selected color components, comprises determining a first set of fixture-dependent values for the first lighting fixture and a second set of fixture-dependent values for the second lighting fixture.

17. The method of claim 11, wherein the selected descriptive value indicates a position adjustment from a home position, and wherein determining at least one fixture-dependent value for the attribute based on the selected descriptive value and the control interface for the one or more lighting fixtures, comprises:
determining a fixture-dependent value of rotation, inclination or directional light beam value based on a supported range of rotation or inclination for each of the one or more lighting fixtures.

18. The method of claim 17, wherein the one or more lighting fixtures include a first lighting fixture and a second lighting fixture and the first lighting fixture has a different control interface than the second lighting fixture, and wherein determining a fixture-dependent value of rotation, inclination or directional light beam value, comprises determining a first set of fixture-dependent values for the first lighting fixture and a second set of fixture-dependent values for the second lighting fixture.

19. The method of claim 11, wherein the selected descriptive value indicates a shape adjustment of a light beam, wherein determining at least one fixture-dependent value for the attribute based on the selected descriptive value and the control interface for the one or more lighting fixtures, comprises:
determining a fixture-dependent value of shutter angle or shutter occlusion of an aperture or aperture size or gobo shape or zoom magnitude or focus of the light beam or frost of the light beam for each of the one or more lighting fixtures.

20. The method of claim 19, wherein the one or more lighting fixtures include a first lighting fixture and a second lighting fixture and the first lighting fixture has a different control interface than the second lighting fixture, and wherein determining a fixture-dependent value of shutter angle or shutter occlusion of an aperture or aperture size or gobo shape or zoom magnitude or focus of the light beam or frost of the light beam, comprises determining a first set of fixture-dependent values for the first lighting fixture and a second set of fixture-dependent values for the second lighting fixture.

21. A lighting controller for controlling a plurality of lighting fixtures, comprising:

a housing having a display;

a lighting controller module configured to receive a relative attribute value from a user interface module and to convert the relative attribute value to one or more fixture-dependent values and to communicate the one or more fixture-dependent values to the lighting fixtures;

the user interface module configured to display context-based interfaces on the display, wherein the context-based interfaces define functions for input controls shown on the display, and wherein the user interface module is configured to receive a selected relative attribute value and to provide the selected relative attribute value to a lighting controller engine; and a handheld computing device, wherein the user interface module is configured to present context-based interfaces on a screen of the handheld device and to coordinate the context-based interfaces shown on the display with the context-based interfaces shown on the handheld computing device.

22. The lighting controller of claim 21, further comprising a plurality of tactile input controls located on the housing, wherein the context-based interfaces define functions for the tactile input controls.

23. The lighting controller of claim 21, wherein the context-based interfaces include at least one of the following context-based interfaces: a context-based interface for selection of at least one of the lighting fixtures, a context-based interface for selecting or altering at least one relative value, a context-based interface for recording a lighting state, and a context-based interface for playing a playlist.

24. The lighting controller of claim 21, wherein the context-based interfaces include a context-based interface for altering of at least one relative attribute value, and wherein the user interface module is configured to display input controls for selecting an attribute family on the display and to display an input control for selecting an attribute tool within the selected attribute family on the display, wherein selection of the attribute tool configures a color input control on the display.

25. The lighting controller of claim 24, wherein selection of the attribute tool configures at least one of the tactile input controls.

26. The lighting controller of claim 21, wherein when the relative attribute value indicates an increase or decrease in a selected color component within a color space, the lighting controller module is further configured to determine at least one fixture-dependent value for the selected color component and at least one fixture-dependent value for any non-selected color components within the color space for each of the lighting fixtures.

27. The lighting controller of claim 21, wherein when the relative attribute value indicates a position adjustment from a home position, the lighting controller module is further configured to determine a fixture-dependent value of rotation, inclination or directional light beam value based on a supported range of attribute values of each of the lighting fixtures.

28. The lighting controller of claim 21, wherein when the relative attribute value indicates a shape adjustment of a light beam, the lighting controller engine is further configured to determine a fixture-dependent value of shutter angle or shutter occlusion of the aperture or aperture size or gobo shape or zoom magnitude or focus of the light beam or frost of the light beam of each of the lighting fixtures.

* * * * *